United States Patent
Knapp

[11] Patent Number: 6,145,150
[45] Date of Patent: Nov. 14, 2000

[54] MULTI-DIMENSIONAL PIG INCLUDING WIPER DISK PERMITTING PASSAGE THROUGH

[76] Inventor: Kenneth M. Knapp, 1209 Hardy, Houston, Tex. 77020

[21] Appl. No.: 09/225,280

[22] Filed: Jan. 5, 1999

[51] Int. Cl.[7] ............................................. B08B 9/04
[52] U.S. Cl. ........................................ 15/104.061; 15/3.5
[58] Field of Search ................... 15/104.061, 104.062, 15/104.03, 104.05, 104.16, 3.5, 3.51

[56] References Cited

U.S. PATENT DOCUMENTS

| | | | |
|---|---|---|---|
| 3,619,844 | 11/1971 | Collins et al. | 15/104.061 |
| 3,879,790 | 4/1975 | Girard | 15/104.061 |
| 4,178,649 | 12/1979 | Kouse et al. | 15/104.061 |
| 4,509,222 | 4/1985 | Knapp | 15/104.061 |
| 4,603,449 | 8/1986 | Knapp | 15/104.061 |
| 4,907,314 | 3/1990 | Kershaw | 15/104.061 |
| 5,698,042 | 12/1997 | Sims et al. | 15/104.061 |

FOREIGN PATENT DOCUMENTS 0 063 024 A1  10/1982  European Pat. Off. .

*Primary Examiner*—Randall E. Chin
*Attorney, Agent, or Firm*—Felsman, Bradley, Vaden, Gunter & Dillon, L.L.P.

[57] ABSTRACT

The present disclosure sets forth a pipeline pig which is formed of two primary dimensions and two primary components. It is made with a set of N disks where N is preferably 6, 7, or 8 and the disks are all provided with a common thickness and common diameter. The thickness is about 10% of the pipe ID while the diameter is about 105% to about 110% of pipe ID. The excess size enables wiping of the inside surface of the pipeline. Importantly, when the disks are folded back, they are spaced sufficiently along the pig so that folded back disks each individually flatten and do not overlap so that folded disks are doubled; this avoids building up the diameter excessively during transition through a small ID opening.

13 Claims, 1 Drawing Sheet

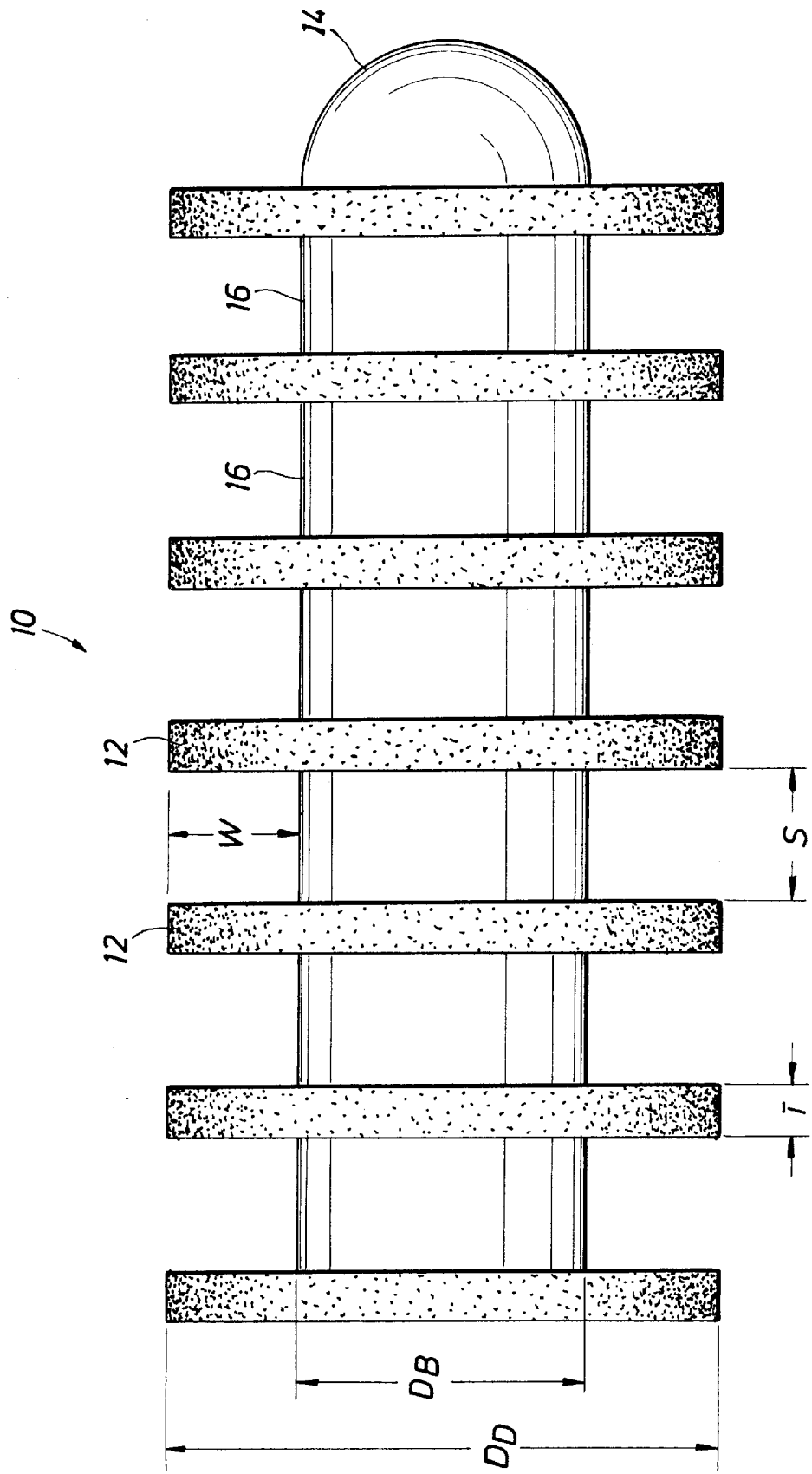

MULTI-DIMENSIONAL PIG INCLUDING WIPER DISK PERMITTING PASSAGE THROUGH

BACKGROUND OF THE DISCLOSURE

The present disclosure is directed to a pipeline pig, especially a pipeline pig to be used in cleaning a series of connected pipes where the pipes change in diameter. When change occurs, the engagement between the side wall of the pipe and the pig will change, and if it changes excessively, the pig can stick. This is highly undesirable, namely, it damages the pig, perhaps destroying it, and creates pressure surges in the lines to move the stuck pig. Eventually of course, the stuck pig will be pushed aside, destroyed, or in some fashion overcome by fluid flow.

The present disclosure is directed to a pipeline pig which is constructed to traverse transitions in pipe diameter. Consider an example which will be given of a nominal 8 inch line with a pig sized for that size of line. Therefore, using an 8 inch line as an example, the present disclosure sets forth a pig with a number of disks in the pig which are made oversized slightly. The oversized disks assure proper contact. Yet, because the disks are oversized, they run the risk of jamming. The present disclosure sets forth a disk equipped body where the disks are made of soft material, the material enabling the disks to fold back over the pig. So to speak, as the pig moves from a high pressure insertion point to a low pressure end, the disks are swept behind the pig. This bends or folds the several disks, thereby enabling the disk to swipe the surface. The disks are made of relatively thin construction in the context. Therefore, the disks are able to fold back, and they compress somewhat thereby providing an adequate wiping surface which is expanded during such constricted transmission along the pipeline. More importantly, the present disclosure defines a spacing and disk construction so that two adjacent disks do not fold back on top of each other thereby achieving excessive thickness. To consider the example just mentioned, using an 8 inch pipeline, the disks are made oversized in diameter by of about 5%–10%, and have a disk thickness of about 10% or less, both being calculated on the basis that the nominal ID of the pipeline equals 100%. The pig is constructed with several disks, the preferred number being at least about 3 to maintain the pig in a concentric and aligned posture within the pipeline. The pig is preferably equipped with several such disks t he preferred embodiment being a whole number integer N where N is preferably in the range of about 4 to 12, and more preferably 6 to 8. More than 12 and fewer than 3 define pigs that are inappropriate.

To enable this kind of pig to travel along a pipeline and especially a pipeline made with changes in diameter, the pig is preferably constructed with a set of disks joined to the body. The preferred form of construction is a single piece construction or alternately plural pieces which are adhesively joined together, alternating between large disks and small donuts. Each donut is a circular blank. The disks and the circular donuts (sometimes known as a torus) are constructed of a common material. This common material is an open cell foam of a specified density. The several disks support and space apart the several donuts. The donuts are painted with a surface layer of heavy duty polyurethane which provides greater hardness. The hardness is sufficient that the body of the pig has greater durability. Effectively, when the disks are assembled with the several donuts, a unitary body is formed, again which can either be single piece construction or adhesively joined donuts alternating with the disks.

SUMMARY OF THE INVENTION

The present apparatus is summarized as a pipeline pig which is constructed with preferably 3 to 12, even more preferably 6, 7, or 8 disks, the disks having a diameter which is about 105% to about 110% of nominal pipeline diameter. It is constructed with a body having a diameter of about 40% to 50% of the nominal pipe diameter. The body is a series of donuts spaced with the several disks. The donut disks are preferably made of the same weight of material, something between about 5 and 12 pounds per cubic foot of foamed polyurethane. The optimum weight is in the range of about 8 to 10 pounds per foot. The outer skin of the body after fabrication is coated with a thin layer which is only a fraction of an inch, typically ranging up to about 0.125, and not more than about 0.250 inches in heavy duty polyurethane which has a cured hardness of about 60 to 75 durometer on the shore A scale. The hardness of the coating of the body assures that the body will remain approximately straight and true during transition and will also remain cylindrical at the time of passing through constricted places. The disks are spaced so that each disk, when folded back by a constriction in the pipeline, will not overlap on the next disk behind it.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

The single view is a side view of the pipeline pig of the present disclosure setting forth the construction thereof and illustrating a plurality of parallel disks of larger diameter than the nominal rating for the pipeline pig.

DETAILED DESCRIPTION OF THE PREFERRED EMBODIMENT

Attention is directed to the only view which shows a pipeline pig 10 constructed in accordance with the teachings of the present disclosure. The pig 10 is formed of two materials. It is formed primarily from two major geometric shapes. The reasons for the material choices, shapes and dimensions will be given in some detail.

The pig 10 is formed with a set of N transverse foam disks 12. The disks 12 are typically evenly spaced along the pipeline pig. The leading disk is just behind the nose piece 14. The nose 14 is constructed with a radius of curvature or can be built with a point. This makes it somewhat more stream lined and somewhat easier to insert in a pig launcher or other pipe opening. The several disks 12 are identical. They are spaced apart by coated donuts 16. The donuts 16 all have a common diameter equal to the nose piece diameter. This is a matter of convenience and reduces inventory where the pig is made of separate pieces. Alternatively, the pig can be formed of a unitary casting of foam material having dimensions to be set forth below where portions of the surface are painted with a thin layer of polyurethane. The N disks in the preferred embodiment are typically about 6, 7, or 8 in number. Effectively, the number of donuts 16 is typically N, also. The ideal mode of construction involves the stacking of the disks and the several donuts 16 in regular fashion as illustrated.

Each disk 12 is made larger than the diameter of the pipe that is the most common diameter in a pigging run. The several disks 12 are all sized to about the same size, and this is typically about 5%, but not more than about 10% oversized construction in contrast with the pipe diameter. If the pipe opening is a nominal 8 inches, the disks 12 are larger by about 0.4 to 0.8 inches. While it is possible to make them larger than that, that distorts the other dimensions of the pig as will be explained. The other dimensions of the pig are correlated to the pipe dimension as will be explained.

As used herein, and as shown in the drawing Figure, the term $D_B$ refers to the diameter of the pig body or donut 16; $D_D$ refers to the diameter of a disk 12; T refers to the thickness of a disk 12; S refers to the spacing between disks; and W refers to the width of a disk, i.e. the radial distance between the pig body and the outer diameter of the disk.

The respective disks 12 are constructed to a thickness of about 7% to 15% of the pipe ID. In correlation to that, the foam is made to a density of about 5 to 12 pounds per cubic foot, the preferred density being around 8 or 10 pounds per cubic foot. With foam of that weight, the disks are able to bend. In addition to that, there is a relative measure of the width between the outer wall of the donut 16 which spaces adjacent disks diameter of the disks. Assume that the donut has a diameter $D_B$ of 40% to 50% of the pipe ID. In that instance, the diameter $D_B$ of each donut 16 is the same. Working with a particular 8 inch pig, meaning one intended for an 8 inch pipeline, the 8 inch pipe size would therefore involve a 2 inch with W of the disks beyond the donuts 16. In the preferred embodiment, the unsupported disk (from donut to pipe) is around 20% to 30%, so that the net dimensions are 3.875 inches in diameter $D_B$ for the donut 16 and 2.375 inches width or overhang of the disks beyond the donut.

The donut 16 is coated on the exterior. This makes it a two component system wherein the core or body of the donut is foamed polyurethane and the outer layer is a heavier density polyurethane. The foam polyurethane is common to the disk also, the weight being given above, and the coating has a thickness of up to about 0.125 inches for smaller models and is about twice that thick for larger models. These are maximum thicknesses; it is preferable that the foam be coated with this layer to a depth sufficient to provide body and durability. This prevents tearing of the foam. Moreover, it defines a surfaces which is essentially impervious to gas flow through the body of the pig. In that sense, the body is effectively impervious to liquid. Moreover, the body is able to resist gas migration through the body. This helps assure that blowby around the pig is held to a minimum.

The pig is thus constructed subject to the following significant structural or dimensional limitations:

1. Each disk has a diameter of about 105% to about 110% of the pipe ID;
2. Each disk has a thickness in the range of about 10%, the range being about 7% to about 15% of pipe ID;
3. Each disk is preferably formed of a lightweight foam, the range being about 5 to 12 pounds, and the preferred range being about 8 to 10 pounds;
4. The preferred number of N disks is in the range of 6, 7, or 8, although 3 to 12 are acceptable;
5. Each disk has an overhang beyond the body of about 25% to 30% of the diameter;
6. The overhang of each disk (beyond the donut) is equal to or less than the height of the adjacent following donut to assure that folding over is permitted, but does not double up where two disks fold over on each other thereby jamming the pig;
7. The pig body is preferably coated with a harder layer of material to hold the body together and to reduce porosity through the pig body;
8. The pig body has a hardness in the range of about 60 to 75 durometer; and
9. The pig is either adhesively joined together or integrally formed to set forth a structure having only two shapes in it meaning the lightweight foam and the heavier polyurethane coating.

Operation of the pig should be considered. Assume that the pig is inserted into an 8 inch pipeline. If the pig encounters a 6 inch ID nipple and is forced through it, the nose 14 will engage the nipple first and pass smoothly through it. Thereafter, the first disk will encounter the reduction and will pass through it also. Consider the following pig construction to accommodate this. Assume that the donut 16 has a diameter equal to about 50% of the pipe ID; in this example that means that it is 4 inches or so. This leaves approximately 55% to about 60% of the disk diameter to be folded over, which folded disk is divided equally (at the top and bottom of the diameter as viewed in the single view) and that enables about 2.2 to about 2.4 inches of the disk to fold over. With the donut dimensions being equal to that or greater, the pig construction enables the first disk to fold over, but it does not stack on the second disk, which is folded over also. Even if all of the N disks are folded over, they do not doubleup and thereby jam.

This pipeline pig is constructed so that it will easily pass through the exemplary 6 inch ID nipple. This pipeline pig will also flex back to its full size when it emerges from the small ID nipple. Effectively, the surface area contact of the N disks against the side wall provides for a good seal during transition. Even when the pipe is full size, there is something of a cant or drag to the angle of the disks. They are swept backwardly. This enables the pig to transition along the pipeline, cleaning as it goes and wiping the surface clear.

What is claimed is:

1. A pipeline pig adapted for transmission through a pipe having a specified ID and capable of passing through a reduced ID section of pipe wherein the pipeline pig comprises:
   (a) an elongate pig body having at least N disks extending radially outwardly therefrom wherein N is a whole number integer in the rage of about 3 to about 12, wherein the pig body has a diameter of about 40% to about 50% of the pipe ID, and wherein each disk defiines an outer diameter and a width between the outer diameter and the pig body, wherein the width is about 25% to 30% of the pipe ID extending beyond the body thereof, and wherein the width is less than the spacing between the disks;
   (b) wherein said disks have a diameter of about 105% to about 110% of the pipe ID and said disks have a thickness of about 7% to about 15% of the pipe ID;
   (c) wherein said disks fold behind during forward motion of the pig against the body of said pipeline pig; and
   (d) wherein said disks are spaced along said body with sufficient spacing that disks do not overlap when folded back during pig passage through the pipe.

2. The apparatus of claim 1 wherein said disks and said pig body are formed of a foamed plastic material having density of about 5 to about 12 pounds per cubic foot; and wherein said disks fold over against the body of said pig and are restored to full diameter on emerging from the pipe.

3. The apparatus of claim 1 wherein said disks and said pig body are formed of a light weight foam having a density in the range of about 8 to 10 pounds per cubic foot.

4. The pipeline pig of claim 3 wherein said pig body is coated with a thickness of about 0.125 inches or greater and said coating has a hardness in the range of about 60 or more durometer on the shore A scale.

5. The pig of claim 4 including N donuts comprising said pig body alternating with said disks, and said donuts are centered with said disks.

6. The apparatus of claim 5 wherein the thickness of said disks is in the range of about 10% of pipe ID, and are uniform in diameter, thickness and density.

7. The pig of claim 1 wherein said pig is comprised of a unitary body incorporating said disks extending radially outwardly therefrom at right angles to said body, and further wherein said pig body comprises a two component system wherein said body is formed of a series of spaced donuts between said disks and said donuts have an outer surface having a coating thereon of harder polyurethane material.

8. The apparatus of claim 7 wherein said harder material is at least about 0.125 inches thick.

9. The apparatus of claim 1 wherein said pig has between 6 and 8 disks, and said disks are evenly spaced along said pig body and said disks are separated by equal height donuts comprising said pig body, and said donuts are coated on an exterior common cylindrical wall thereof with a layer of harder polyurethane material.

10. The apparatus of claim 9 wherein said pig body is a foamed open cell having a density of at least about 8 pounds per foot.

11. The apparatus of claim 1 wherein the pipeline pig body is centered with respect to said disks and said pig body and disks collectively are formed of a common weight foam having a density in the range of about 5 to about 12 pounds per cubic foot, and further wherein said disks are spaced along said pig body by a distance sufficient so that said disks, when forced back against the pig body on passage through a small ID pipe, do not stack to thereby prevent excessive enlargement of the pig during operation.

12. The apparatus of claim 11 wherein each of said disks is parallel, said disks are folded back on movement in a pipe, and said disks comprise foamed, open cell material formed as a unitary pig with said body.

13. The pig of claim 12 including a coating on said pig body of about 0.125 inches thickness, or greater, wherein said coating is flexible polyurethane, and said coating has a hardness of about 60 or greater on the shore A scale.

* * * * *